United States Patent [19]
DeField et al.

[11] Patent Number: 5,746,397
[45] Date of Patent: May 5, 1998

[54] AIRCRAFT DEFUELING SYSTEM

[76] Inventors: Topper DeField; Brent DeField, both of 4135 Autumn La., Billings, Mont. 59106

[21] Appl. No.: 664,343

[22] Filed: Jun. 14, 1996

[51] Int. Cl.$^6$ .................................. B64D 37/12
[52] U.S. Cl. .................. 244/135 R; 137/683; 137/209; 227/82
[58] Field of Search ............... 246/135 R, 136; 137/68.2, 68.3, 68.11, 209, 899.2; 222/82, 83, 394

[56] References Cited

U.S. PATENT DOCUMENTS

| | | | |
|---|---|---|---|
| 1,793,777 | 2/1931 | Condon | 224/136 |
| 2,200,922 | 5/1940 | Heigis | 224/135 R |
| 2,248,308 | 7/1941 | Rice | 244/136 |
| 2,262,722 | 11/1941 | Grant, Jr. | 244/135 R |
| 2,880,749 | 4/1959 | Brown | 137/344 |
| 2,899,106 | 8/1959 | Weinert | 222/82 |
| 2,956,866 | 10/1960 | Dick | 23/288 |
| 3,001,536 | 9/1961 | Casey | 137/68.3 |
| 3,089,677 | 5/1963 | Savaria | 251/58 |
| 3,288,992 | 11/1966 | Matsudaira et al. | 137/68.3 |
| 3,693,915 | 9/1972 | Ulanovsky | 244/135 R |
| 4,038,817 | 8/1977 | Snow et al. | 60/204 |
| 4,049,221 | 9/1977 | Fountain | 137/68.3 |
| 4,253,626 | 3/1981 | Muscatell | 244/135 R |
| 4,441,673 | 4/1984 | Muscatell | 244/135 R |
| 4,804,157 | 2/1989 | Muscatell | 244/135 R |
| 4,936,389 | 6/1990 | MacDonald et al. | 169/53 |

*Primary Examiner*—Galen L. Barefoot
*Attorney, Agent, or Firm*—David Pressman; Jack Lo

[57] ABSTRACT

An aircraft defueling system includes a fuel jettison port (10) extending between the bottom side of a fuel tank (11) an the exterior of an aircraft. The port is sealed with a glass closure (12). A cylinder (13) with a piston (17) therein is positioned above the glass closure. A pressurized inert gas bottle (23) is connected to an expandable chamber (28) between the top ends of the cylinder and the piston. A metering port (27) is arranged on the side of the cylinder below the piston. Just prior to an unavoidable crash, a valve (25) on the gas bottle is opened to force the piston downwardly, so that the glass closure is broken by a conical bottom extension (18) on the piston. The piston is moved past the metering port. The inert gas is released into the fuel tank through the metering port, so as to pressurized the fuel tank and rapidly jettison the fuel through the port. When the fuel tank is emptied of fuel, it is filled with the inert gas, so that the possibility of fire and explosion due to the presence of fuel upon impact is eliminated.

19 Claims, 2 Drawing Sheets

AIRCRAFT DEFUELING SYSTEM

BACKGROUND OF THE INVENTION

1. Field of the Invention

This invention relates generally to aircraft defueling systems, specifically to a defueling system that improves safety during an emergency.

2. Prior Art

During a crash landing, the fuel in an aircraft is easily ignited by hot engine parts or the sparks that occur during impact. In low-speed crashes or forced landings that are otherwise survivable, many people are killed by the explosions and fires that follow. Defueling systems have been proposed to enable the flight crew to jettison fuel to lighten the aircraft for improved gliding performance, a softer landing, and reduced fire hazard. However, insofar as I am aware, no defueling system has been commercially implemented. U.S. Pat. No. 2,880,749 to Brown (1959) discloses a fuel dumping system in which pressure in a hydraulic line actuates two pistons, so that a valve opens, allowing the fuel to leave the tanks via a hose. U.S. Pat. No. 2,956,866 to Dick (1957) discloses a valve for jettisoning hydrogen peroxide fuel prior to an inevitable crash. It includes a simple needle valve and a catalytic chamber for diluting the hydrogen peroxide to render it less harmful. U.S. Pat. No. 3,089,677 to Savaria (1959) discloses an fuel dump valve that includes a valve head sealed by a movable seat. U.S. Pat. No. 4,253,626 to Muscatell (1981) discloses a fuel ejection system that includes a retractable fuel-holding bulkhead that is moved into an exposed position for more efficient ejection. U.S. Pat. No. 4,441,673 to Muscatell (1984) discloses a fuel dumping valve seat in the fuel tank and a valve head or obturator which, when moved away from the seat opens the tank to allow the fuel to jettison. The valve seat is connected to a linkage system that employs a hydraulically controlled locking pins, and an interlocking sequence control mechanism. U.S. Pat. No. 4,038,817 to Snow et al. (1977) discloses a fuel jettisoning system with an interlock, so that the jettisoning valve cannot be actuated unless the engine is running. This prevents discharge on the ground, jettisoning when any augmenter (fuel flow booster) is running, and actuation of the augmenter if fuel is being jettisoned.

However, all prior-art defueling systems depend on gravity to drain the fuel from the tanks, which may not defuel the aircraft rapidly enough if landing or crashing is imminent. Any remaining fuel poses a serious fire hazard. Even if the aircraft is completely defueled, the fuel vapor that remain in the tanks can still explode. Furthermore, all prior-art defueling systems are relatively complicated.

OBJECTS OF THE INVENTION

Accordingly the primary objects of the present invention are to provide an improved aircraft defueling system that, prior to an unavoidable crash or forced landing, defuels an aircraft rapidly to lighten it for improving gliding performance and reducing the force of impact, and that prevents the aircraft from catching fire or exploding upon impact.

Additional objects are to provide an aircraft defueling system that is simple and reliable, that eliminates fuel vapor from a defueled tank, that can be used to inspect the quantity and purity of fuel in a tank, that does not use complex electronic controls, that is not affected by lightning strikes or electrical failures, that is sealed so that it has no contaminant entry points, that can eliminate in-flight fuel fires which may occur in a disabled aircraft, that can empty any individual fuel tank rapidly, that eliminates the need for passengers to rapidly deplane after a crash landing, that can ignite jettisoned fuel safely so it will not fall to the ground, and that can be tested easily, economically, and rapidly. Further objects of the present invention will become apparent from a consideration of the drawings and ensuing description.

SUMMARY OF THE INVENTION

An aircraft defueling system includes a piston positioned at the upper end of a cylinder with a closed top and an open bottom. The cylinder is positioned above a glass port on the bottom of an aircraft's fuel tank. An inert gas bottle is connected to the top of the cylinder. Prior to an inevitable crash, a valve on the gas bottle is opened. The gas forces the piston downwardly, and the glass port is shattered by a conical lower end of the piston. The inert gas is released into the fuel tank through an exposed vent hole or metering port on the cylinder wall; the metering port is exposed to the gas when the gas pushes the piston down below the metering port. The tank thus cannot be pressurized until the glass is shattered. The pressure in the tank forces the fuel out rapidly through the broken glass port. After the tank is emptied of fuel, the fuel vapor is also forced out by the inert gas, so that the possibility of fire and explosion is eliminated.

Figure 1:
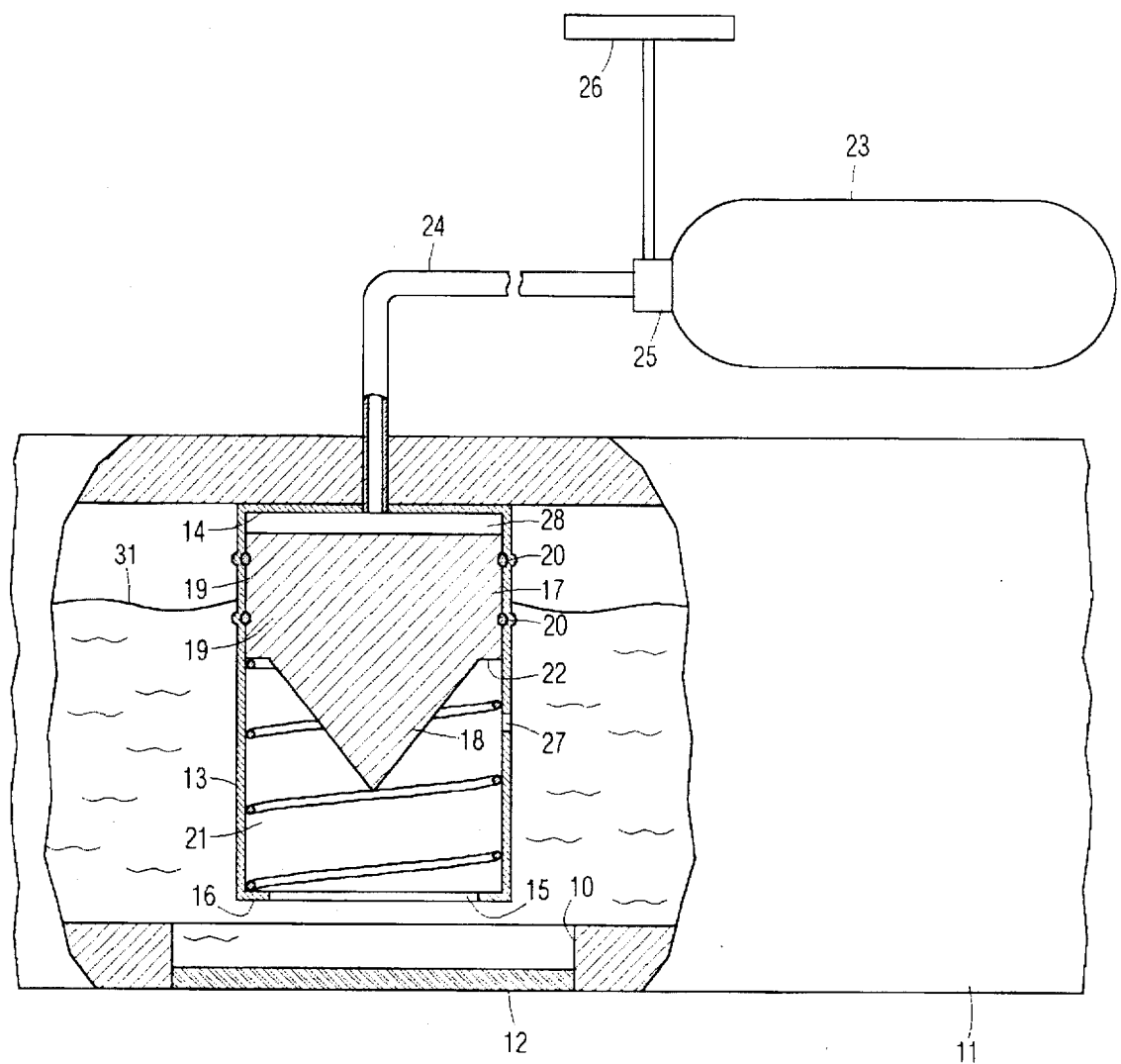
FIG. 1 is a side cutaway view of an aircraft defueling system in accordance with a preferred embodiment of the invention.
Figure 2:
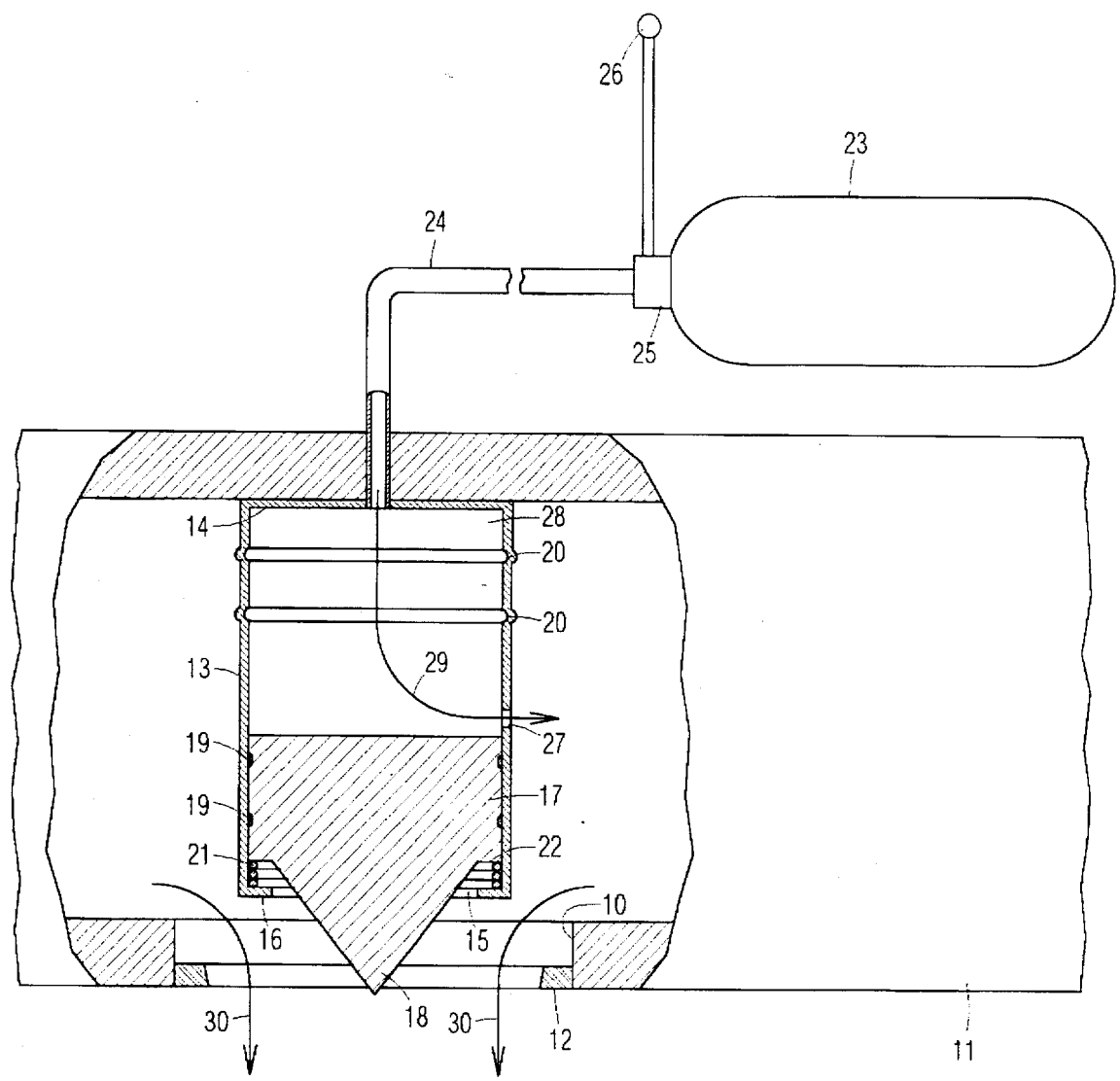
FIG. 2 is a side cutaway view of the aircraft defueling system after it has been activated.

| Drawing Reference Numerals | |
|---|---|
| 10. Fuel Jettison Port | 11. Fuel Tank |
| 12. Tempered Glass Closure | 13. Cylinder |
| 14. Top Closure | 15. Bottom Opening |
| 16. Inner Flange | 17. Actuating Piston |
| 18. Conical Bottom Extension | 19. O-Rings |
| 20. Annular Grooves | 21. Coil Spring |
| 22. Shoulder | 23. Gas Bottle |
| 24. Tube | 25. Valve |
| 26. Handle | 27. Metering port |
| 28. Chamber | 29. Inert Gas Flow |
| 30. Fuel Flow | 31. Fuel |

DESCRIPTION—FIG. 1—INITIAL CONDITION

In accordance with a preferred embodiment of the invention shown in the side cutaway view of FIG. 1, an aircraft defueling system includes a fuel tank 11 with fuel 31. Fuel tank 11 is usually part of the wing, fuselage, and/or empennage. A jettison port 10 extends between a bottom surface of tank 11 and the exterior of the aircraft, which in the example shown is the lower surface of wing tank 11. Port 10 is sealed by a tempered, flat glass closure 12. A cylinder 13 is positioned above closure 12. Cylinder 13 includes a top closure 14, and a bottom opening 15 with an inner flange 16. An actuating piston 17 with a pointed conical bottom extension 18 is positioned within cylinder 13 at the upper end thereof Ground workers can inspect fuel 30 for quantity, type (by color), and contaminants via glass closure 10. Closure 10 can be coated with a layer of transparent silicone rubber (not shown) to provide protection against foreign-body impacts.

Piston 17 is secured in position by a pair of O-rings 19 engaged in a pair of matching annular grooves 20 on the interior of cylinder 13. A coil spring 21 is positioned between a lower surface or shoulder 22 of piston 17 and flange 16 of cylinder 13 to urge piston 17 upwardly and further help keep it in position. A pressurized gas bottle 23 filled with an inert gas, such as nitrogen or helium, is connected to top closure 14 of cylinder 13 by a tube 24. Gas bottle 23 includes a normally-closed valve 25 operated by a handle 26, which is positioned in the cockpit of the aircraft. Handle 26 is shown in the closed position. Gas bottle 23 may be installed in any convenient location, such as in the cockpit. A metering port 27 is positioned in the wall of cylinder 13, below the at-rest position of piston 17. An expandable chamber 28 is defined between top closure 14 of cylinder 13 and the top of piston 17.

The gas pressure in tank 23 is preferably about 170 atmospheres, and piston 17 is about 10 cm in diameter, with all other parts sized proportionately.

DESCRIPTION—FIG. 2—ACTUATION

If a hard landing or crash appears unavoidable, one of the flight crew (not shown) turns handle 26 to the open position as shown to allow the gas in tank 23 to pressurize and expand chamber 28. This pressure disengages O-rings 19 from grooves 20, forces piston 17 down, and compresses spring 21. Glass closure 12 is shattered by conical bottom extension 18 of piston 17, which is stopped by flange 16. The inert gas is released into fuel tank 11 through metering port 27, as indicated by arrow 29. Fuel tank 11 is thereby pressurized, and the fuel is rapidly jettisoned through port 10 and shattered glass closure 12, as indicated by arrows 30. Metering port 27 can be about 5 mm in diameter to limit fuel tank 11 to about 5,625 kg/m$^2$ (8 psi) to avoid overpressuring it. Of course, the larger the tank, the larger the metering port should be. However, it should not be large enough to overpressuring tank 11.

Fuel tank 11 and all other fuel tanks (not shown), which have a similar defueler, are quickly emptied of fuel, and the fuel vapor is also forced out and replaced by the inert gas. Gliding and handling performance of the aircraft is improved due to the reduced weight. E.g., on a large jet, about ⅓ of its weight on takeoff is fuel; this can be over 100,000 kg of fuel in 5 or 6 tanks. When the lightened, fuel-free aircraft impacts the ground, the force of impact is reduced, and the possibility of fire or explosion from fuel in a tank is completely eliminated.

SUMMARY, RAMIFICATIONS AND SCOPE

Accordingly, the reader will see that I have provided an aircraft defueling system that, prior to an unavoidable crash, rapidly defuels an aircraft to lighten it, so as to improve gliding, handling, and braking performance, and reduce the force of impact. It replaces the fuel and fuel vapor in the fuel tanks with an insert gas, so as to completely eliminate the possibility of fire or explosion upon impact. It is also simple and reliable. It requires no electrical or electronic components, so it is immune to lightning, radiation, and electrical failure. When the aircraft crashes, since the possibility of fire is virtually eliminated, the passengers will not tend to deplane under panic, thereby further reducing injuries. The system can be tested easily by visual inspection through glass 12, and by a pressure or weight check of tank 23.

Although the above descriptions are specific, they should not be considered as limitations on the scope of the invention, but only as examples of the embodiments. Many other ramifications and variations are possible within the teachings of the invention. For example, glass closure 12 may be flat. Ceramic or other frangible or breakable materials may be used for closure 12. Other types of inert gases may be used. Piston 17 may be secured in its initial position by either spring 21 or O-rings 19, so that one of them may be eliminated. Other devices may be used for retaining piston 17 in its initial position. Instead of a breakable glass closure, a conventional movable valve seat may be used for unsealing port 10. Instead of flat, the glass closure can have a meniscus, concave-planar, or convex-planar shape, with the bottom surface either concave or convex. Valve 25 may be operated by an electrical control, either manual or automatic. The metering port/pressure regulator can include a check valve for preventing back flow of the inert gas into the cylinder. The aircraft can carry a pyrotechnic projectile, such as a flare, that can be fired at the ejected fuel automatically while defueling to ignite it, and thereby prevent any fuel from falling to earth where it may harm the environment, persons, and/or property. Metering port 27 may be sized for pressurizing fuel tank 11 at higher or lower pressures. Additional metering ports 27 may be provided. An electrical pump may be provided to increase the fuel jettisoning rate. The defueling system can be used for other vehicles, including automobiles, armored vehicles, boats, ships, etc. The component sizes and other parameters can be widely varied. Several piston and glass port arrangements, each connected to a respective gas bottle, can be used with a single a fuel tank to increase fuel outflow, or where the aircraft has several tanks, each can have its own piston, glass port, and gas bottle, so as to enable fuel to be jettisoned from any individual tank without affecting the other tanks. The fuel tank vent can be closed automatically when the fuel jettison arrangement is actuated; this will prevent escape of the gas which is pumped in to force the fuel out.

Therefore, the reader is requested to determine the scope of the invention by the appended claims and their legal equivalents, and not by the examples given.

We claim:

1. A defueling system for jettisoning fuel from a fuel tank, comprising:

a fuel jettison port on said fuel tank for providing an exit for said fuel;

an openable frangible closure sealing said fuel jettison port;

a pressurized gas bottle containing a gas, said gas bottle being connectable to said fuel tank, said gas in said bottle (a) having sufficient pressure to pressurize said fuel tank so as to rapidly jettison said fuel when said gas in said bottle is connected to said fuel tank, and (b) having sufficient volume to fill said fuel tank when said fuel tank is emptied of said fuel, so as to eliminate the possibility of fire and explosion; and means for opening said closure on said fuel jettison port for jettisoning said fuel and releasing said gas into said fuel tank, said means comprising a valve for controlling flow of said gas from said bottle, a cylinder positioned adjacent said openable closure, said cylinder containing a piston, said cylinder connected to said gas bottle on one side of said piston and containing a vent on another side of said piston, such that when said valve is opened, said gas will force said piston to move within said cylinder and strike, break, and thereby open said removable frangible closure and allow said gas to flow through said vent.

2. The defueling system of claim 1 wherein said gas comprises an inert gas.

3. The defueling system of claim 1 wherein said gas comprises nitrogen gas.

4. A defueling system for jettisoning fuel from a fuel tank, comprising:

a fuel jettison port adapted to be arranged on a bottom side of said fuel tank so as to provide an exit for said fuel;

a glass closure sealing said fuel jettison port;

a vertical cylinder positioned above said glass closure, said cylinder including a top closure and an open bottom, said cylinder being positioned within said fuel tank;

a piston positioned within said cylinder at an upper end thereof, a top end of said piston and said top closure of said cylinder defining an expandable chamber;

a metering port extending through a side of said cylinder below said piston;

a pressurized gas bottle containing a gas, said gas bottle being connected to said expandable chamber in said cylinder; and a valve connected to said gas bottle for selectably releasing said gas into said expandable chamber and forcing said piston downwardly against said glass closure, said piston breaking said glass closure upon contact therewith so as to jettison said fuel through said fuel jettison port, said piston moving past said metering port, so that said inert gas is released into said fuel tank, said inert gas being adapted to pressurize said fuel tank to rapidly jettison said fuel, said inert gas being adapted to fill said fuel tank when said fuel tank is emptied of said fuel, so as to eliminate the possibility of fire and explosion.

5. The defueling system of claim 4 wherein said gas comprises an inert gas.

6. The defueling system of claim 4 wherein said gas comprises nitrogen gas.

7. The defueling system of claim 4 wherein said glass closure comprises a tempered glass closure.

8. The defueling system of claim 4 wherein said metering port is sized for pressuring said fuel tank at a maximum pressure of about 2110 kilograms per square meter.

9. The defueling system of claim 4, further including a conical bottom extension arranged on said piston for breaking said glass closure.

10. The defueling system of claim 4, further including an inner flange arranged around said open bottom of said cylinder, and a coil spring positioned between a lower end of said piston and said inner flange of said cylinder for urging said piston to remain at said upper end of said cylinder.

11. The defueling system of claim 4, further including an O-ring encircling said piston, and a matching annular groove arranged within said cylinder adjacent said upper end thereof, said O-ring engaging said annular groove for maintaining said piston at said upper end of said cylinder.

12. The defueling system of claim 11, further including an O-ring encircling said piston, and a matching annular groove arranged within said cylinder adjacent said upper end thereof, said O-ring engaging said annular groove for maintaining said piston at said upper end of said cylinder.

13. A defueling system for jettisoning fuel from an aircraft, comprising:

a fuel tank adapted to receive said fuel;

a fuel jettison port arranged on a bottom side of said fuel tank, said fuel jettison port having an inner end communicating with an interior of said fuel tank, said fuel jettison port having an outer end communicating with an exterior of said aircraft;

a glass closure sealing said fuel jettison port;

a vertical cylinder positioned in said fuel tank above said glass closure, said cylinder including a top closure and an open bottom;

a piston positioned within said cylinder at an upper end thereof, a top end of said piston and said top closure of said cylinder defining an expandable chamber;

a metering port extending through a side of said cylinder below said piston;

a pressurized gas bottle containing a gas, said gas bottle being connected to said expandable chamber in said cylinder;

a valve connected to said gas bottle for selectably releasing said gas into said expandable chamber and forcing said piston downwardly against said glass closure, said piston breaking said glass closure upon contact therewith so as to jettison said fuel through said fuel jettison port, said piston moving past said metering port, so that said gas is released into said fuel tank, said gas pressurizing said fuel tank for rapidly jettisoning said fuel, said gas filling said fuel tank when said fuel tank is emptied of said fuel, so as to eliminate the possibility of fire and explosion.

14. The defueling system of claim 13 wherein said gas comprises an inert gas.

15. The defueling system of claim 13 wherein said gas comprises nitrogen gas.

16. The defueling system of claim 13 wherein said glass closure comprises a tempered glass closure.

17. The defueling system of claim 13 wherein said metering port is sized for pressuring said fuel tank at a maximum pressure of about 2110 kilograms per square meter.

18. The defueling system of claim 13, further including a conical bottom extension arranged on said piston for breaking said glass closure.

19. The defueling system of claim 13, further including an inner flange arranged around said open bottom of said cylinder, and a coil spring positioned between a lower end of said piston and said inner flange of said cylinder for urging said piston to remain at said upper end of said cylinder.

* * * * *